Figure 1A:
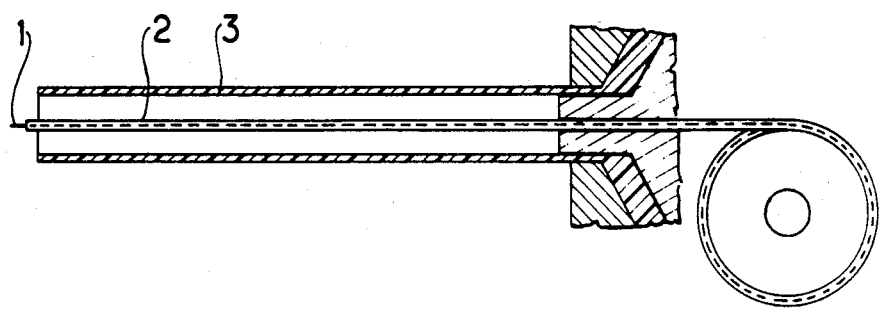

United States Patent [19]

Dubost et al.

[11] 4,141,623
[45] Feb. 27, 1979

[54] OPTICAL FIBRE CABLE AND A METHOD OF MANUFACTURE

[75] Inventors: René Dubost, Faverges de la Tour; Bernard Grenat, La Mulatiere, both of France

[73] Assignee: Societe Anonyme dite: Les Cables de Lyon, Lyons, France

[21] Appl. No.: 796,815

[22] Filed: May 13, 1977

[30] Foreign Application Priority Data

May 21, 1976 [FR] France .................. 76 15421

[51] Int. Cl.² ................ G02B 5/16; B65H 81/00
[52] U.S. Cl. .................. 350/96.23; 156/172; 174/70 R
[58] Field of Search ............ 350/96.23; 174/70 R; 156/172

[56] References Cited

U.S. PATENT DOCUMENTS

| 3,887,265 | 6/1975 | Margolis et al. ........... 350/96.23 |
| 4,076,382 | 2/1978 | Oestreich ................. 350/96.23 |

FOREIGN PATENT DOCUMENTS

| 2513722 | 9/1976 | Fed. Rep. of Germany ........ 350/96.23 |
| 1425928 | 2/1976 | United Kingdom ............. 350/96.23 |

*Primary Examiner*—John K. Corbin
*Assistant Examiner*—Stewart Levy
*Attorney, Agent, or Firm*—Haseltine, Lake & Waters

[57] ABSTRACT

A multiple optical fibre cable in which the fibres can be used separately for long distance signal transmission comprises a central core round which the optical conductors are concentically disposed. Each optical conductor is constituted by an optical fibre protected by a first layer or covering of polyamide and a second layer or sheath of polyethylene. In order to avoid distortion of the optical fibre, the second layer or sheath is stretched. Application: Optical telecommunications cables.

8 Claims, 4 Drawing Figures

OPTICAL FIBRE CABLE AND A METHOD OF MANUFACTURE

The present invention relates to a cable having a plurality of optical fibres which can be used separately for the transmission of telephone, data or television signals and it also relates to a method of producing such a cable.

It is known that the construction of such cables requires elaborate installation techniques and materials. The conventional optical conductor is surrounded by a first plastics sheath in which it is free and not stretched, this first sheath being itself surrounded by a second plastics sheath with a diameter larger than the outside diameter of the first sheath. In particular, optical fibres are assembled generally under very low tension and require complex materials which are very expensive and difficult to install.

Preferred embodiments of the cable according to the invention mitigate these drawbacks. Indeed, in this cable, the optical conductor is not free and is stretched in the first sheath. The performance of this cable is capable of long-distance transmission while allowing it to tbe installed on conventional cable-making machines and to be laid according to usual techniques in a conduit or in a trench.

The present invention provides a cable of optical fibres which can be used separately for signal transmission, the cable comprising a central core and optical conductors constituted by said fibres and disposed concentrically, the optical fibres having a diameter of about 100 microns being covered with a first protective layer made of a first plastics material applied on the fibre with a clearance of a few microns, the fibre covered with the first layer receiving a second protective layer obtained by extrusion of a second plastics material, this second protective layer forming a tube round the first protective layer and leaving between them a sufficient clearance of a few tenths of a millimeter, wherein said first plastics material has a high modulus of elasticity and the second plastics material has a lower melting point and a lower modulus of elasticity than those of said first material, the optical conductors covered with their protective layers being assembled in concentric layers with tensions such that the elastic limit of the second plastics material is exceeded but that of the first material is not exceeded and the second protective layer is extruded at a temperature such that the first sheath does not undergo any softening.

It also provides a method of producing a cable wherein the optical conductors covered with their two protective layers are assembled by twisting on a central core in concentric layers with tensions such that the elastic limit of the second protective layer is exceeded, thereby taking up the excess of length of fibre provided with its first protective layer and wherein the assembly of conductors is bound by tapes on the central core for the first layer or on the peripheral layers.

Figure 1B:
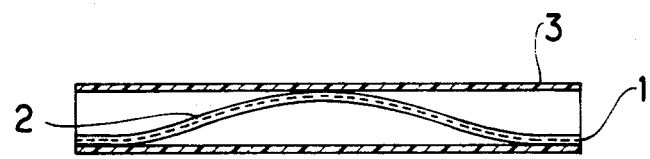
Figure 1C:
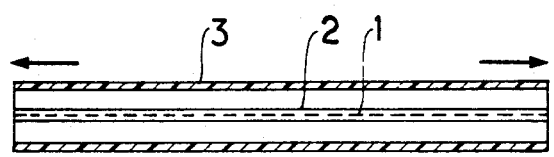
Figure 2:
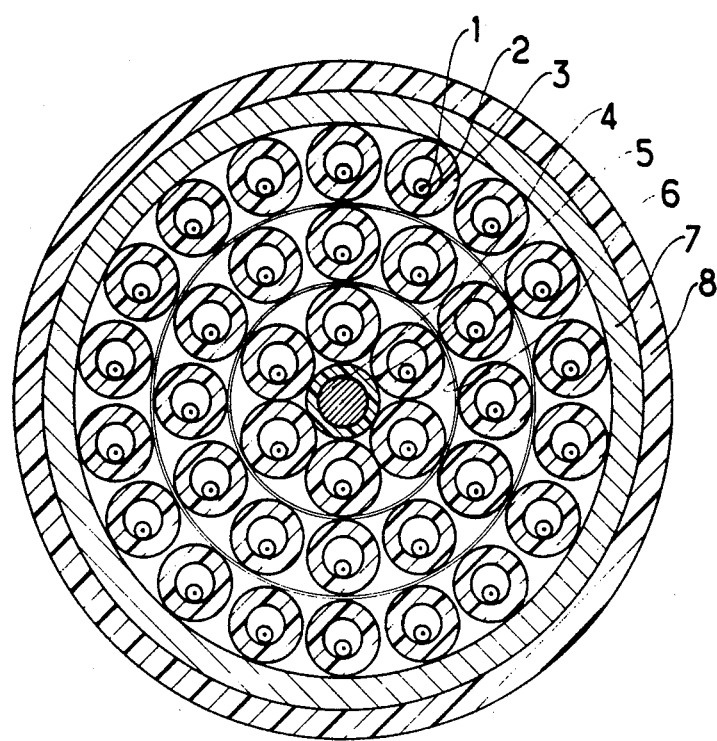

An embodiment of the present invention is described by way of example having no limiting character with reference to the accompanying drawings in which:

FIG. 1a, 1b and 1c are longitudinal cross-sections showing different phases in the manufacture of an optical conductor; and FIG. 2 is a transverse cross-section of a cable formed according to the invention.

The method of manufacture consists of forming a cable comprising a central core and concentrically disposed optical conductors.

An assembly machine is used for this purpose. The central core is constituted by a metallic support (copper or steel) or by any other support e.g. fibres having a high modulus of elasticity. Simultaneously, the optical conductor is manufactured as follows:

In FIG. 1a, optical fibres 1 with a diameter of about 100 microns are protected by a layer of plastics material 2 having a high modulus of elasticity (of the order of 300 daN/mm$^2$) e.g. a polyamide extruded on the fibre by means of a plastics material extrusion machine (not shown). The covering thus formed exerts a moderate compressive force on the fibre. Radial clearances of the order of a few microns between the fibre and its protective sheath are satisfactory. Such clearance is a compromise between the reduced effects of microdistortions of the axis of the fibre and the negligible effects of the variations of the attenuation of the fibre as a function of the temperature, these effects generally being observed due to differential linear expansions of the protective plastics material and of the silica constituting the fibre.

The optical fibre thus protected receives a second protective layer in the form of a sheath 3 obtained by extrusion of a thermoplastic material (FIG. 1a) whose main characteristics are:

Relatively low modulus of elasticity (of the order of 120 daN/mm$^2$) compared with that of the material of the first protective layer;

Extrusion temperature of the material constituting the second layer or sheath 3 (of the order of 180° C.) is lower than the softening temperature of the material of the first layer or covering 2 (of the order of 200° C.) in order not to alter said first layer.

Radial clearance between the fibre protected by the first layer and the inside diameter of the second layer of the order of a few tenths of a millimeter.

During this manufacturing phase, the linear shrinkage of the sheath 3 caused by the cooling of the material is such that length of the fibre which is protected by the covering 2 is longer than the length of the sheath 3. So that the fibre is compelled to form a sinusoid inside the sheath 3 (FIG. 1b). The pitch of this sinusoid is a function of the shrinkage of the material constituting the sheath, of clearance between the first and second protective layers and of the tension on the sheath during intermediate production phases or on assembly.

The pitch and the amplitude of the sinusoid are critical parameters. If the pitch is too short, additional transmission losses due to microcurves of the fibre are observed. If the pitch is too long the subsequent manufacturing operations, in particular the assembly of the conductors can give rise to excessive tension in the fibre.

If the clearance between the two layers is large, the the amplitude of the sinusoid is great and the effect can be assimilated to a short pitch. If the clearance between the two layers is small, the amplitude of the sinusoid is small and the effect can be assimilated to a long pitch.

If the clearance is too small, e.g. in the order of a tenth of a millimeter, between the outside diameter of the first layer and the inside diameter of the second layer, there is a danger that the two layers will adhere to each other on extrusion, causing a connection making it impossible to stretch the second layer on assembly to take up the excess length of the optical conductor.

One great advantage of the second layer is that it makes the protected fibre unit insensitive to lateral stresses since the sheath has dimensions which enable it to withstand lateral pressures due to winding on a reel, superposition of layers, bending of the cable, lateral stresses on laying, etc.

The optical conductors are referenced by colouring the sheath 3, this overcoming the disadvantages of colouring referencing in the mass of protective material of the first layer. These disadvantages are known and are generally ascribed to the granulometry of the pigments in contact with the fibre, whose attenuation increases.

The elements thus constituted, namely an optical fibre covered with its two plastics layers of protection are then assembled in concentric layers on the central core having an identical diameter to that of the second protective layer. All the usual combinations of conductors 1 + 6, 1 + 12, 1 + 6 + 12 + 18, etc., are possible and depend on the required constitution of the cable to be manufactured.

The cable elements are assembled and twisted with a tension such that the elongation of the sheaths constituting the second protective layers is such that the fibre covered by its first protective layer is straightened out (FIG. 1c).

These tubes are kept stretched by strongly binding hoops formed by means of tapes laid by means of conventional reels on the assembly machines. Each layer of optical conductors is thus bound. An adequate choice of the material constituting the second protective layer is such that the assembly tensions exceed the elastic limit of the material.

Thus, the optical conductors are practically under zero tension, this eliminating a great part of the additional transmission loses generally observed when they are assembled.

A plastic or metallic protective sheath is applied on the assembled elements, and its being slighthy tight assists in holding together the previously described structure.

A useful outer sheath is made from a press extruded aluminium tube which is swaged on the assembled cable elements. Besides its mechanical characteristics which are suitable for the laying of the cable thus constituted in a conduit or a trench, this aluminium sheath covered with a plastics protective sheath can provide a return path for remote supply currents of the line amplifiers whose feed path is the central copper conductor. The aluminium tube can also be formed from an aluminium band folded round elements which have been assembled and then welded and swaged.

FIG. 2 shows the embodiment of a cable with a central core and peripheral optical conductors. By way of an example having no limiting character, it is constituted as follows:

An elementary optical conductor constituted by an optical fibre protected by first and second protective layers, namely:

A fibre (1) with a diameter of 125/μ protected by a polyamide extrusion (2) with a diameter of 0.85 mm. The clearance between the fibre and the polyamide is of the order of 3 to 4 microns.

A low-density coloured polyethylene sheath (3) with dimensions of 1.4 × 2.5 mm extruded over the first layer. The radial clearance is therefore close to 0.3 mm. These elementary conductors are distributed concentrically to a central core (4) made of 12/10 mm copper.

The following are assembled on this core covered with polyamide (5) whose diameter is 2.5 mm:
A layer of 6 elements of diameter of 2.5 mm;
A layer of 12 elements of diameter of 2.5 mm;
A layer of 18 elements of diameter of 2.5 mm; at tensions of the order of 400 grammes. Each layer is held by means of four tapes (6) of paper 70 grammes/m². The outside diameter of these 36 assembled elements is of the order of 18 mm.

An aluminium sheath (7) whose thickness is 1.2 mm is applied by press extrusion and swaged on these 36 assembled elements, bringing the diameter to 20.4 mm.

A black polyethylene sheath (8) having a thickness of 1 mm constitutes the outer casing having a diameter of 22.4 mm for a 36-fibre cable.

In such a configuration,
The increase in the transmission losses is of the order of 1 to 2 dB/km;
The breaking load of the cable is about 750 kg.

The cable formed according to the present invention can be used for long-distance transmission of telephone signals, data and television transmissions.

Applications come within the field of optical fibre cables.

What we claim is:

1. A cable of optical fibers which can be used separately for signal transmission, said cable comprising: a central core; a bundle of optical fibers disposed concentrically around said core, said fibers having a diameter of about 100 microns and being covered with a first protective layer made of a first plastic material exhibiting a high modulus of elasticity and applied on the fiber with a clearance of a few microns; a second protective layer formed by extrusion of a second plastic material defining a tubular shaped protective layer formed about said first protective layer and having between them a clearance of a few tenths of a millimeter, said second plastic material having a lower melting point and a lower modulus of elasticity than that of said first plastic material; said optical fibers covered with their respective protective layers being assembled in concentric layers with longitudinal tension to exceed an elastic limit of said second plastic material while not that of said first material; such second protective layer being formed by extrusion at a temperature inhibiting softening of said first sheath; a sheath of an electrically conductive metal surrounding said outer concentric layer of optical fibers; and an outer sheath of plastic material.

2. A cable according to claim 1, wherein: said first protective layer being made of polyamide and the second protective layer being made of polyethylene.

3. A cable according to claim 1, wherein: the central core constitutes a feed path for remote power supply and said protective aluminum sheath provides a return path respectively for remote power supply to line amplifiers.

4. A cable according to claim 1, wherein: the optical conductors being referenced by colouring the mass of the second protective layer.

5. A method of producing a cable having a conductor assembly according to claim 1 including the steps of: covering optical fibers with two protective layers; twisting a central core of said cable in concentric layers in tension to a point where the elastic limit of the second protective layer is exceeded; taking up an excess length of fiber provided with its first protective layer and binding said assembly of conductors by tapes on the central core of the first layer and on a next inner layer for successive taping.

6. A cable according to claim 1, wherein: mechanical protection is provided on the outer layer of optical conductors by a protective aluminium sheath said sheath being further defined by an outer covering made of a plastic material.

7. A cable as claimed in claim 6, wherein: said sheath being extruded and swaged.

8. A cable as claimed in claim 6, wherein: said sheath being welded and swaged.

* * * * *